US010870728B2

(12) United States Patent
Ahn et al.

(10) Patent No.: US 10,870,728 B2
(45) Date of Patent: Dec. 22, 2020

(54) PHTHALONITRILE RESIN (71) Applicant: LG CHEM, LTD., Seoul (KR)

(72) Inventors: Ki Ho Ahn, Daejeon (KR); Sang Woo Kim, Daejeon (KR); Seung Hee Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/739,263

(22) PCT Filed: Jul. 1, 2016

(86) PCT No.: PCT/KR2016/007109
§ 371 (c)(1),
(2) Date: Dec. 22, 2017

(87) PCT Pub. No.: WO2017/003250
PCT Pub. Date: Jan. 5, 2017

(65) Prior Publication Data
US 2018/0194895 A1    Jul. 12, 2018

(30) Foreign Application Priority Data
Jul. 1, 2015  (KR) .................. 10-2015-0094357

(51) Int. Cl.
*C08G 73/10*  (2006.01)
*C08K 3/00*   (2018.01)
(Continued)

(52) U.S. Cl.
CPC ....... *C08G 65/333* (2013.01); *C08G 75/0222* (2013.01); *C08K 3/00* (2013.01);
(Continued)

(58) Field of Classification Search
CPC .................................................. C08G 73/10
(Continued)

(56) References Cited

U.S. PATENT DOCUMENTS 5,965,268 A   10/1999  Sastri et al.
6,297,298 B1  10/2001  Keller et al.

FOREIGN PATENT DOCUMENTS

CN    102993070 A    3/2013
JP    2002519277 A   7/2002
(Continued)

OTHER PUBLICATIONS

Peter, Hande et al., "4,4'-(4,4'-Thiodiphenoxy)diphthalonitrile", Acta Crystallographica, Section E: Structure Reports Online, [Electronic Publication] Mar. 24, 2004, vol. 60, No. 4, pp. 0621-0622.
Peng, .Xuegang et al., "Synthesis and Properties of a Novel High-temperature Diphenyl Sulfone-based Phthalonitrile Polymer". High Performance Polymers, 2014, vol. 26, No. 7. pp. 837-845.
H. Petek et al., "4,4'-(4,4'-Thiodiphenoxy) diphthalonitrile," Acta Crystallographica Section E: Structure Reports Online, John Wiley & Sons, GB, vol. 60, No. 4, Apr. 1, 2004, pp. 0621-0622, XP009502998.
X. Peng et al., "Synthesis and properties of a novel high-temperature diphenyl sulfone-based phthalonitrile polymer," High Performance Polymers, vol. 26, No. 7, Nov. 1, 2014, pp. 837-845, XP055342870.
(Continued)

*Primary Examiner* — Duc Truong
(74) *Attorney, Agent, or Firm* — Dentons US LLP (57) ABSTRACT The present application relates to a phthalonitrile resin and the like. The present application can provide a phthalonitrile resin, and a polymerizable composition and prepolymer using the same, which can exhibit excellent curability, a suitable processing temperature and a wide process window, and form a composite having excellent physical properties. Also, according to the present invention, there may be provided a phthalonitrile resin, and a polymerizable composition and prepolymer using the same, which can exhibit appropriate viscosity characteristics and thus provide a final product without deterioration of mechanical physical properties or the like due to bubbles generated during processing.

7 Claims, 2 Drawing Sheets (51) Int. Cl.
  *C08G 65/333* (2006.01)
  *C08G 75/0222* (2016.01)
  *C08L 71/00* (2006.01)
  *C08L 81/02* (2006.01)
  C07C 255/04 (2006.01)
  C08L 79/08 (2006.01)
  C04B 35/83 (2006.01)

(52) U.S. Cl.
  CPC .............. C08L 71/00 (2013.01); C08L 81/02 (2013.01); *C04B 35/83* (2013.01)

(58) Field of Classification Search
  USPC ........................................................ 528/332
  See application file for complete search history.

(56) References Cited

FOREIGN PATENT DOCUMENTS

| KR | 10-2001-0072625 A | 7/2001 |
|---|---|---|
| KR | 10-0558158 B1 | 2/2006 |
| SU | 1509352 A1 | 9/1989 |
| WO | 9936446 A1 | 7/1999 |
| WO | 0000350 A1 | 1/2000 |

OTHER PUBLICATIONS

Takekoshi, T., "Synthesis of High Performance Aromatic Polymers via Nucleophilic Nitro Displacement Reaction," General Electric Company, Research and Development Center, Polymer Journal, vol. 19, No. 1, pp. 191-202 (1987).

PHTHALONITRILE RESIN

TECHNICAL FIELD

This application is a National Stage Entry of International Application No. PCT/KR2016/007109 filed on Jul. 1, 2016, and claims the benefit of Korean Application No. 10-2015-0094357 filed on Jul. 1, 2015, all of which are hereby incorporated by reference in their entirety for all purposes as if fully set forth herein.

The present application relates to a phthalonitrile resin, a polymerizable composition, a prepolymer, a composite, a method for producing the same, and a use thereof.

BACKGROUND ART

A phthalonitrile resin can be used in various applications. For example, a composite formed by impregnating the phthalonitrile resin with a filler such as glass fiber or carbon fiber can be used as a material for automobiles, airplanes, ships, and the like. The process for producing the composite may comprise, for example, a process of mixing a mixture of phthalonitrile and a curing agent or a prepolymer formed by reaction of the mixture, with the filler and then curing the mixture (see, for example, Patent Document 1).

In order to effectively perform the process for producing the composite, it is required that phthalonitrile, which is a monomer, or a polymerizable composition or prepolymer formed therefrom has appropriate fusiblity and fluidity, and a so-called process window is wide.

In addition, if the mixture of phthalonitrile and a curing agent or the prepolymer contains voids after being processed or cured, deterioration of physical properties in the composite may occur, and thus such a problem should also be considered.

PRIOR ART DOCUMENTS

Patent Documents (Patent Document 1) Korean Patent No. 0558158

DISCLOSURE

Technical Problem

The present application provides a phthalonitrile resin, a polymerizable composition, a prepolymer, a composite, a precursor of the composite, and a preparation method and use thereof. The present application can provide phthalonitrile, and a polymerizable composition and prepolymer using the same, which can exhibit excellent curability, a suitable processing temperature and a wide window process, and form a composite having excellent physical properties.

Technical Solution

The present application relates to a phthalonitrile resin. The phthalonitrile resin may comprise a polymerized unit derived from a compound of Formula 1 below. In the present application, the term polymerized unit derived from a certain compound may mean a skeleton of a polymer formed by polymerization or curing of the compound.

[Formula 1]

In Formula 1, $Ar_1$ and $Ar_2$ are the same or different aromatic divalent radicals, $X_1$ and $X_2$ are each independently an alkylene group, an alkylidene group, an oxygen atom or a sulfur atom, and $R_1$ to $R_{10}$ are each independently hydrogen, an alkyl group, an alkoxy group, an aryl group or a cyano group, provided that at least two of $R_1$ to $R_5$ are each a cyano group and at least two of $R_6$ to $R_{10}$ are each a cyano group.

In the present application, the term aromatic divalent radical may mean a divalent residue derived from benzene, a benzene-containing compound or a derivative of any of the foregoing, unless otherwise specified. Here, the benzene-containing compound may mean a compound having a structure in which two or more benzene rings are condensed while sharing two carbon atoms or linked by an appropriate linker. The aromatic divalent radical may comprise, for example, 6 to 25, 6 to 20, 6 to 15 or 6 to 12 carbon atoms.

In one example, the aromatic divalent radical can be a radical derived from an aromatic compound of any of Formulas 2 to 4 below.

[Formula 2]

In Formula 2, $R_1$ to $R_6$ are each independently hydrogen, an alkyl group, an alkoxy group or an aryl group, provided that at least one of $R_1$ to $R_6$ forms a radical linked to the sulfur atom (S) of Formula 1 and at least one of $R_1$ to $R_6$ forms a radical linked to $X_1$ or $X_2$ of Formula 1.

[Formula 3]

In Formula 3, $R_1$ to $R_8$ are each independently hydrogen, an alkyl group, an alkoxy group or an aryl group, provided that at least one of $R_1$ to $R_8$ forms a radical linked to the sulfur atom (S) of Formula 1 and at least one of $R_1$ to $R_8$ forms a radical linked to $X_1$ or $X_2$ of Formula 1.

[Formula 4]

In Formula 4, $R_1$ to $R_{10}$ are each independently hydrogen, an alkyl group, an alkoxy group or an aryl group, provided that at least one of $R_1$ to $R_{10}$ forms a radical linked to $X_1$ or $X_2$ of Formula 1, and L is an alkylene group, an alkylidene group, an oxygen atom or a sulfur atom.

$R_1$ to $R_6$ of Formula 2, $R_1$ to $R_8$ of Formula 3 or $R_1$ to $R_{10}$ of Formula 4 are each independently hydrogen, an alkyl group, an alkoxy group or an aryl group, provided that at least two of the respective substituents can each form a radical linked to Formula 1. Here, the formation of the radical linked to Formula 1 may mean that any one of the substituents is directly linked to the sulfur atom (S) of Formula 1, and any one is directly linked to $X_1$ (in case of $Ar_1$) or $X_2$ (in case of $Ar_2$) of Formula 1. In another example, each of the substituents without forming any radical may be hydrogen, an alkyl group or an alkoxy group, or may be hydrogen or an alkyl group. For example, in Formula 2, any one of $R_1$ and $R_4$ may be a moiety directly linked to the sulfur atom (S) of Formula 1 and the other may be a moiety directly linked to $X_1$ (in case of $Ar_1$) or $X_2$ (in case of $Ar_2$) of Formula 1, or any one of $R_1$ and $R_3$ may be a moiety directly linked to the sulfur atom (S) of Formula 1 and the other may be a moiety directly linked to $X_1$ (in case of $Ar_1$) or $X_2$ (in case of $Ar_2$) of Formula 1. In this case, the substituents without forming any radical may be each independently hydrogen, an alkyl group, an alkoxy group or an aryl group; or hydrogen, an alkyl group or an alkoxy group; or hydrogen or an alkyl group. In addition, in Formula 3, any one of $R_1$, $R_6$, $R_7$ and $R_8$ may be a moiety directly linked to the sulfur atom (S) of Formula 1, or a moiety directly linked to $X_1$ (in case of $Ar_1$) or $X_2$ (in case of $Ar_2$) of Formula 1, and any one of $R_1$, $R_2$, $R_3$, $R_4$ and $R_5$ may be a moiety directly linked to $X_1$ (in case of $Ar_1$) or $X_2$ (in case of $Ar_2$), and the remaining substituents are each independently hydrogen, an alkyl group, an alkoxy group or an aryl group; hydrogen, an alkyl group or an alkoxy group; or hydrogen or an alkyl group. Furthermore, in Formula 4, any one of $R_1$ to $R_5$ may be a moiety directly linked to the sulfur atom (S) of Formula 1 or a moiety directly linked to $X_1$ (in case of $Ar_1$) or $X_2$ (in case of $Ar_2$) of Formula 1, and any one of $R_6$ to $R_{10}$ may be a moiety directly linked to $X_1$ (in case of $Ar_1$) or $X_2$ (in case of $Ar_2$) of Formula 1 or a moiety directly linked to the sulfur atom (S) of Formula 1, and the remaining substituents may be each independently hydrogen, an alkyl group, an alkoxy group or an aryl group; hydrogen, an alkyl group or an alkoxy group; or hydrogen or an alkyl group. Also, in Formula 4, L may be an alkylene group, an alkylidene group, an oxygen atom or a sulfur atom, and in another example, may be an alkylene group, an alkylidene group or an oxygen atom or an oxygen atom.

In the present application, the term alkyl group may be an alkyl group having 1 to 20 carbon atoms, 1 to 16 carbon atoms, 1 to 12 carbon atoms, 1 to 8 carbon atoms or 1 to 4 carbon atoms, unless otherwise specified. The alkyl group may be linear, branched or cyclic and, if necessary, may be substituted with one or more substituents.

In the present application, the term alkoxy group may be an alkoxy group having 1 to 20 carbon atoms, 1 to 16 carbon atoms, 1 to 12 carbon atoms, 1 to 8 carbon atoms or 1 to 4 carbon atoms, unless otherwise specified. The alkoxy groups may be linear, branched or cyclic and, if necessary, may be substituted with one or more substituents.

In the present application, the term aryl group may mean a monovalent residue derived from benzene, a compound comprising a benzene structure or any one derivative of the forgoing as described in the item of the above aromatic divalent radicals, unless otherwise specified. The aryl group may comprise, for example, 6 to 25, 6 to 20, 6 to 15 or 6 to 12 carbon atoms. A specific kind of the aryl group can be exemplified by a phenyl group, a benzyl group, a biphenyl group or a naphthalenyl group, and the like, without being limited thereto. Also, in the category of the aryl group in the present application, not only a functional group commonly referred to as an aryl group but also an aralkyl group or an arylalkyl group, and the like may be included.

In the present application, the term alkylene group or alkylidene group may mean an alkylene group or alkylidene group having 1 to 20 carbon atoms, 1 to 16 carbon atoms, 1 to 12 carbon atoms, 1 to 8 carbon atoms, or 1 to 4 carbon atoms, unless otherwise specified. The alkylene group or alkylidene group may be linear, branched or cyclic. In addition, the alkylene or alkylidene group may be optionally substituted with one or more substituents.

In the present application, as the substituent with which the alkyl group, alkoxy group, aryl group, aromatic divalent radical, alkylene group or alkylidene group may be optionally substituted, halogen such as chlorine or fluorine, an epoxy group such as a glycidyl group, an epoxyalkyl group, a glycidoxyalkyl group or an alicyclic epoxy group, an acryloyl group, a methacryloyl group, an isocyanate group, a thiol group, an alkyl group, an alkoxy group or an aryl group, and the like can be exemplified, without being limited thereto.

In Formula 1, $X_1$ and $X_2$ may be the same or different from each other. $X_1$ and $X_2$ may be each independently an alkylene group, an alkylidene group, an oxygen atom or a sulfur atom, and in another example, may be an alkylene group, an alkylidene group or an oxygen atom, or an oxygen atom.

In Formula 1, $R_1$ to $R_5$ are each independently hydrogen, an alkyl group, an alkoxy group, an aryl group or a cyano group, provided that at least two of $R_1$ to $R_5$ are each a cyano group. In another example, $R_1$ to $R_5$ other than a cyano group may be each independently hydrogen, an alkyl group or an alkoxy group, or may be hydrogen or an alkyl group. In one example, in Formula 1, $R_3$ and $R_4$ may be each a cyano group, and $R_1$, $R_2$ and $R_5$ may be each independently hydrogen, an alkyl group, an alkoxy group or an aryl group, may be hydrogen, an alkyl group or an alkoxy group, or may be hydrogen or an alkyl group.

In Formula 1, $R_6$ to $R_{10}$ are each independently hydrogen, an alkyl group, an alkoxy group, an aryl group or a cyano group, provided that at least two of $R_6$ to $R_{10}$ are each a cyano group. In another example, $R_6$ to $R_{10}$ other than a cyano group may be each independently hydrogen, an alkyl group or an alkoxy group, or may be a hydrogen atom or an alkyl group. In one example, in Formula 1, $R_8$ and $R_9$ may be each a cyano group, and $R_6$, $R_7$ and $R_{10}$ may be each independently hydrogen, an alkyl group, an alkoxy group or an aryl group, may be hydrogen, an alkyl group or an alkoxy group, or may be hydrogen or an alkyl group.

When a compound having the structure such as Formula 1 is applied to the phthalonitrile resin structure, a suitable processing temperature and the like can be secured, and the reactivity with the curing agent can also be kept excellent. The compound of Formula 1 can provide a phthalonitrile resin, a polymerizable composition and a prepolymer, which can exhibit excellent curability, a suitable processing temperature and a wide process window, and form a composite having excellent physical properties.

In addition, the phthalonitrile resin, the polymerizable composition and the prepolymer, and the like, formed by the compound, exhibit a low viscosity in a molten state, and even when gas is generated during the curing process, removal of the gas is effectively performed, whereby deterioration of mechanical physical properties due to the space remaining in the final product may not be caused.

In one example, the processing temperature of the compound may be in a range of, for example, 100° C. to 350° C. or 100° C. to 250° C. In the present application, the term processing temperature may mean a temperature where the compound, and the following polymerizable composition or prepolymer comprising the same, and the like are present in a processable state. Such a processing temperature may be, for example, a softening point, a melting temperature (Tm), or a glass transition temperature (Tg). Such a range is advantageous for realizing a polymerizable composition or prepolymer which can exhibit appropriate fluidity and processability, secure a wide process window, and form a composite of excellent physical properties.

The compound of Formula 1 can be synthesized by a known synthesis method of organic compounds. For example, the compound of the Formula 1 can be synthesized by a reaction known as a so-called nitro displacement reaction, for example, a method of reacting an aromatic compound containing a hydroxy group and an aromatic compound containing a nitro group in the presence of a basic catalyst or the like.

The phthalonitrile resin may also further comprise polymerized units of other phthalonitrile compounds in addition to the polymerized unit of the compound of Formula 1. In such a case, the kind of the phthalonitrile compound that can be selected and used is not particularly limited, and known compounds noted to be useful for formation of the phthalonitrile resin and control of its physical properties can be applied. As an example of such a compound, compounds can be exemplified, which are known in U.S. Pat. No. 4,408,035, 5,003,039, 5,003,078, 5,004,801, 5,132,396, 5,139,054, 5,208,318, 5,237,045, 5,292,854, or 5,350,828, and various compounds known in the art besides those described above can be included in the above examples.

In the phthalonitrile resin, the polymerized unit of the compound of Formula 1 may be a polymerized unit formed by the reaction of the compound of Formula 1 with a curing agent. In such a case, the kind of the curing agent that can be used is not particularly limited as long as it can react with the compound of the Formula 1 to form a polymer, and for example, any compound can be used as long as it is a compound known to be useful for formation of the so-called phthalonitrile resin. Such a curing agent is known in various documents including the above-described U.S. patents.

In one example, an amine compound such as an aromatic amine compound or a hydroxy compound can be used as a curing agent. In the present application, the hydroxy compound may mean a compound containing at least one or two hydroxy groups in the molecule. Curing agents which can cure a phthalonitrile compound to form a resin are variously known, and such curing agents can be applied in most cases in the present application.

The present application also relates to a polymerizable composition. The polymerizable composition may comprise the compound of Formula 1 described above. The polymerizable composition may further comprise a curing agent together with the compound of Formula 1.

Here, the kind of the curing agent which can be used is not particularly limited, and for example, curing agents such as those already described can be used.

The ratio of the curing agent in the polymerizable composition is not particularly limited. For example, the ratio can be adjusted so that the desired curability can be ensured in consideration of the ratio or kind of the curable component, such as the compound of Formula 1, contained in the composition. For example, the curing agent may be contained in an amount of about 0.02 to 1.5 moles per mole of the compound of Formula 1 contained in the polymerizable composition. However, the above ratio is only an example of the present application. Usually, as the ratio of the curing agent in the polymerizable composition increases, the process window tends to become narrower, and as the ratio of the curing agent decreases, the curability tends to become insufficient, and thus the ratio of the curing agent may be appropriately selected in consideration of these points.

The polymerizable composition of the present application can exhibit a proper processing temperature and a wide process window while having excellent curability.

In one example, the processing temperature, i.e., the melting temperature or the glass transition temperature, of the polymerizable composition may be in the range of 100° C. to 350° C. or 100° C. to 250° C. In such a case, the process window of the polymerizable composition, that is, the absolute value of the difference (Tc–Tp) between the processing temperature (Tp) and the curing temperature (Tc) of the compound of Formula 1 and the curing agent may be 50° C. or higher, 70° C. or higher or 100° C. or higher. In one example, the curing temperature (Tc) may be higher than the processing temperature. Such a range may be advantageous for securing proper processability, using the polymerizable composition, for example, in the process of producing a composite to be described below. The upper limit of the process window is not particularly limited, but for example, the absolute value of the difference (Tc–Tp) between the processing temperature (Tp) and the curing temperature (Tc) may be 300° C. or lower or 200° C. or lower.

The compound of Formula 1 contained in the polymerizable composition may have a viscosity ranging from 100 cP to 10000 cP, 100 cP to 8000 cP or 100 cP to 5000 cP at a temperature of 150° C. or higher or about 150° C. As the compound has the viscosity in this range, removal of bubbles generated during the processing is easily performed, whereby deterioration of mechanical physical properties and the like of the final product can be prevented.

The polymerizable composition may further comprise various additives including other phthalonitrile compounds, and the like, in addition to the compound of the Formula 1. As an example of such an additive, various fillers can be exemplified. The kind of the material that can be used as the filler is not particularly limited, and all the known fillers suitable depending on the intended use may be used. As the exemplary filler, a metal material, a ceramic material, glass, a metal oxide, a metal nitride or a carbon-based material, and the like can be exemplified, without being limited thereto. In addition, the form of the filler is also not particularly limited and may be various forms, for example, a fibrous material such as aramid fiber, glass fiber or ceramic fiber, or a woven fabric, nonwoven fabric, string or cord formed by the material, particles comprising nanoparticles, polygons or other amorphous forms, and the like. Here, as the carbon-based material, graphite, graphene or carbon nanotubes, and the like, or derivatives and isomers such as their oxides can be exemplified. However, the components that the polymerizable composition may further comprise are not limited to the above, and for example, various monomers known to be applicable to production of so-called engineering plastics such as polyimide, polyamide or polystyrene, or other additives may also be included depending on the purpose without limitation.

The present application also relates to a prepolymer formed by reaction of the polymerizable composition, that is, the polymerizable composition comprising the compound of Formula 1 and a curing agent.

In the present application, the term prepolymer state is a state where the compound of Formula 1 and the curing agent undergo a certain degree of polymerization in the polymerizable composition (for example, a state where polymerization in a step of a so-called stage A or B has occurred), but do not reach the completely polymerized state and exhibit appropriate fluidity, and for example may mean a state capable of processing a composite, as described below. In one example, the prepolymer state may mean a state where polymerization of the polymerizable composition proceeds to some extent.

The prepolymer may also exhibit excellent curability, a suitable processing temperature and a wide process window. In addition, the prepolymer can exhibit stability over time even when it is stored at room temperature for a long time.

For example, the processing temperature, for example, the glass transition temperature or the melting temperature, of the prepolymer may be in the range of 100° C. to 350° C. or 100° C. to 250° C. In such a case, the process window of the prepolymer, that is, the absolute value of the difference (Tc−Tp) between the processing temperature (Tp) and the curing temperature (Tc) of the prepolymer may be 50° C. or higher, 70° C. or higher, or 100° C. or higher. In one example, the curing temperature (Tc) may be higher than the processing temperature (Tp). Such a range may be advantageous for securing appropriate processability, using the prepolymer, for example, in the process of preparing a composite to be described below. Here, the upper limit of the process window is not particularly limited, but for example, the absolute value of the difference (Tc−Tp) between the processing temperature (Tp) and the curing temperature (Tc) may be 300° C. or lower, or 200° C. or lower.

The prepolymer may also have a viscosity before the curing reaction occurs in the range of 100 cP to 10000 cP, 100 cP to 8000 cP, or 100 cP to 5000 cP at a temperature of 150° C. or higher or about 150° C. As the prepolymer has the viscosity in this range, removal of bubbles generated during the processing is easily performed, whereby deterioration of mechanical physical properties of the final product can be prevented.

The prepolymer may further comprise any known additive in addition to the above components. As an example of such an additive, the above-mentioned fillers and the like can be exemplified, without being limited thereto.

The present application also relates to a composite. The composite may comprise the above-described phthalonitrile resin and filler. As described above, through the compound of the Formula 1 of the present invention excellent curability, a suitable processing temperature and a wide process window can be achieved, and accordingly, a so-called reinforced resin composite (reinforced polymer composite) comprising various fillers can be easily formed. The composite thus formed may comprise the phthalonitrile resin and the filler, and for example, may be applied to various applications including durables, and the like for automobiles, airplanes, ships or the like.

The kind of the filler is not particularly limited and may be suitably selected in consideration of the intended use. As the specific kind of the filler that can be used, the above-described materials and the like can be exemplified, without being limited thereto.

Also, the ratio of the filler is not particularly limited, and may be set in an appropriate range depending on the intended use.

The present application also relates to a precursor for preparing the composite, wherein the precursor may comprise, for example, the polymerizable composition and the filler as described above, or the prepolymer and the filler as described above.

The composite can be prepared in a known manner using the precursor. For example, the composite can be formed by curing the precursor.

In one example, the precursor may be prepared by combining a polymerizable composition comprising the compound of Formula 1 and the curing agent, or the prepolymer formed by pre-curing the polymerizable composition, in a state melted by heat or the like, with the filler, if necessary. For example, the precursor thus produced may be molded into a desired shape and then cured to prepare the above-described composite. The polymerizable composition or prepolymer has an appropriate processing temperature and a wide process temperature and superior curability, so that molding and curing can be efficiently performed in the above processes.

In the above processes, the method of forming the prepolymer or the like, and the method for preparing the composite by combining such a prepolymer or the like with the filler, followed by processing and curing, and the like may be carried out according to known methods.

Advantageous Effects

The present application can provide a phthalonitrile resin, and a polymerizable composition and prepolymer using the same, which can exhibit excellent curability, a suitable processing temperature and a wide process window, and form a composite having excellent physical properties. Also, according to the present invention, there may be provided a phthalonitrile resin, and a polymerizable composition and prepolymer using the same, which can exhibit appropriate viscosity characteristics and thus provide a final product without deterioration of mechanical physical properties or the like due to bubbles generated during processing.

MODE FOR INVENTION

Hereinafter, the phthalonitrile resin and the like of the present application will be specifically described by way of examples and comparative examples, but the scope of the resins and the like is not limited to the following examples.

1. NMR (Nuclear Magnetic Resonance) Analysis

NMR analysis of compounds synthesized in Preparation Examples 1 to 3 was carried out by using a 500 MHz NMR equipment from Agilent as the manufacturer's manual. A sample for NMR measurement was prepared by dissolving the compound in DMSO (dimethyl sulfoxide)-d6.

2. DSC (Differential Scanning Calorimetry) Analysis

DSC analysis was carried out in a $N_2$ flow atmosphere using a Q20 system from TA instrument while raising the temperature from 35° C. to 450° C. at a heating rate of 10° C./min.

3. TGA (Thermogravimetric Analysis) Analysis

TGA analysis was performed using a TGA e850 instrument from Mettler-Toledo. In the case of the compounds prepared in Preparation Examples, they were analyzed in a $N_2$ flow atmosphere while raising the temperature from 25° C. to 800° C. at a heating rate of 10° C./min, and in the case of compositions prepared in Examples and Comparative Examples, after post-curing them at a temperature of 375° C., they were analyzed in a $N_2$ flow atmosphere while raising the temperature from 25° C. to 900° C. at a heating rate of 10° C./min.

4. Viscosity Analysis

Viscosity was measured using a DHR instrument from TA. For the target of viscosity measurement, for example, the compound in each preparation example, the viscosity was measured while raising the temperature from 180° C. to 400° C. at a heating rate of about 5° C./min.

Preparation Example 1. Synthesis of Compound (PN1)

The compound of Formula A below was synthesized in the following manner. First, 37.1 g of the compound of Formula B below (4,4'-thiodiphenol) and 200 g of DMF (dimethyl formamide) were introduced to a 3 neck RBF (round bottom flask) and dissolved by stirring at room temperature. 58.9 g of the compound of Formula C below was added thereto, 50 g of DMF was added, and then dissolved by stirring. Subsequently, 62.2 g of potassium carbonate and 50 g of DMF were introduced together, and the temperature was raised to 85° C. while stirring. The mixture was reacted for about 5 hours and the reactant was cooled at room temperature. The cooled reaction solution was neutralized and precipitated by pouring it into 0.2 N hydrochloric acid aqueous solution, and filtered, followed by washing with water. Then, the filtered reactant was dried in a vacuum oven at 100° C. for one day, and after removal of water and residual solvent, the compound of Formula A was obtained in a yield of 80% by weight.

[Formula A]

[Formula B]

[Formula C]

Figure 1:
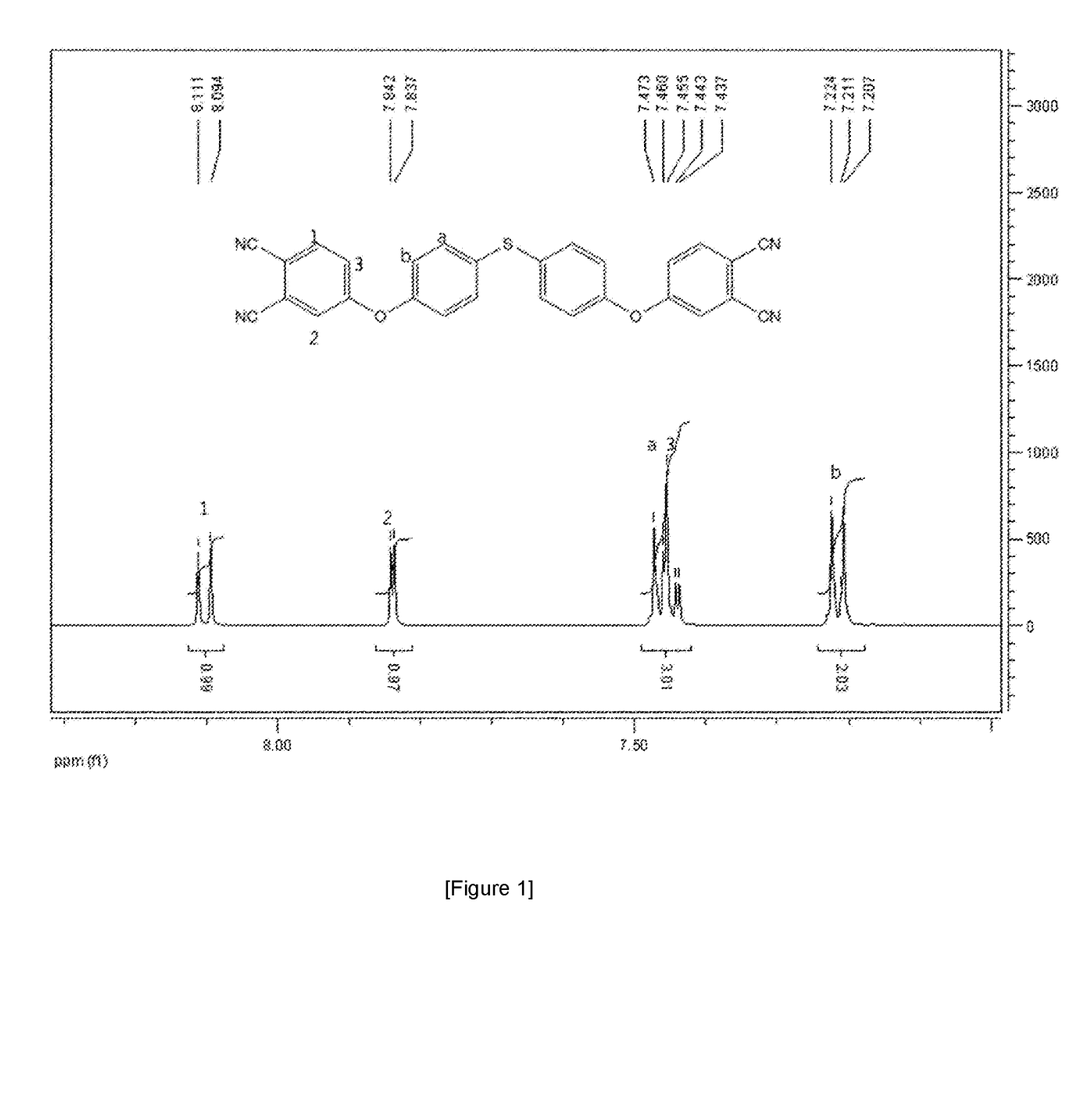
FIGS. 1 and 2 are NMR analysis results for the compounds prepared in Preparation Examples 1 and 2.

NMR analysis results for the compound of Formula A were shown in FIG. 1.

Preparation Example 2. Synthesis of Compound (PN2)

27.9 g of the compound of Formula D below and 100 mL of DMF (dimethyl formamide) were introduced to a 3 neck RBF (round bottom flask) and dissolved by stirring at room temperature. 51.9 g of the compound of Formula C (4-nitrophthalonitrile) in Preparation Example 1 was added, 50 g of DMF was added, and then dissolved by stirring. Subsequently, 62.2 g of potassium carbonate and 50 g of DMF were introduced together, and then the temperature was raised to 85° C. while stirring. The mixture was reacted for about 5 hours, and then the reactant was cooled to room temperature. The cooled reaction solution was neutralized and precipitated by pouring it into 0.2N hydrochloric acid aqueous solution. After filtration, it was washed with water. Then, the filtered reactant was dried in a vacuum oven at 100° C. for one day. After removal of water and residual solvent, the compound of Formula E below (PN2) was obtained in a yield of 83% by weight.

[Formula D]

[Formula E]

Figure 2:
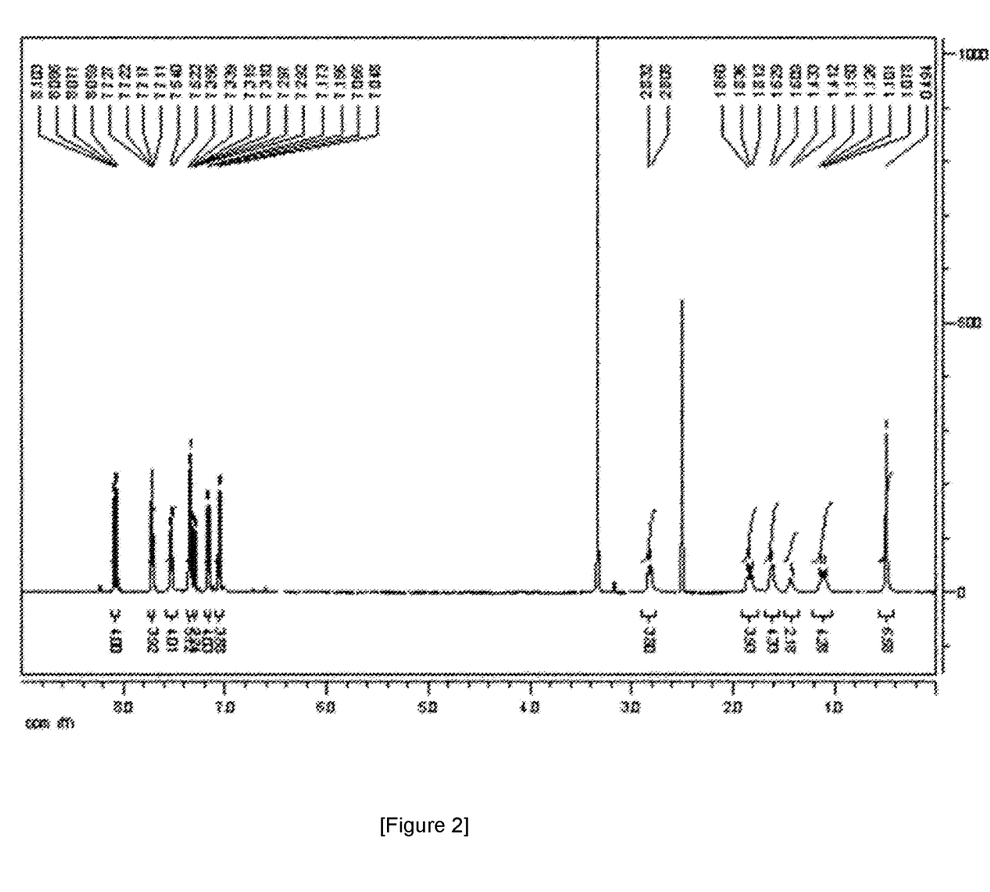

The NMR analysis results for the compound of Formula D are shown in FIG. 2. The analytical results for the above compounds are summarized in Table 1.

PREPARATION Example 3. Synthesis of Compound (CA1)

The compound of Formula F below (CA1) was commercially available from TCI (Tokyo Chemical Industry Co., Ltd.) and used without further purification.

[Formula F]

DSC and TGA analysis results for the compounds (PN1, PN2) in Preparation Examples 1 and 2 are summarized in Table 1 below.

TABLE 1

|  |  | Processing Temperature (° C.) | Residue (%) at 375° C. | Residue (%) at 800° C. |
|---|---|---|---|---|
| Preparation Example 1 | PN1 | 182 | 96.4 | 1.1 |
| Preparation Example 2 | PN2 | 233.3 | 99.2 | 11.2 |

Example 1

To the compound (PN1) of Formula A in Preparation Example 1, 3 mol % of the compound of Preparation Example 3 (CA1, Formula F) relative to the used amount of the compound of Formula A was added and mixed well to prepare a polymerizable composition. The results of performing DSC and TGA analyses and viscosity analysis of the composition are shown in Table 2 below. The prepolymer can be prepared by heating the polymerizable composition at 240° C. for several minutes. If the prepared prepolymer is heated to about 375° C. by raising the temperature again at 240° C. to complete heat curing, the phthalonitrile resin can be prepared.

Comparative Example 1

A prepolymer and a phthalonitrile resin were prepared in the same manner as in Example 1, except that the compound (PN2) of Formula E in Preparation Example 2 was used instead of the compound of Formula A. The results of DSC and TGA analyses and viscosity analysis performed on the above are shown in Table 2 below.

The results of DSC and TGA analyses and viscosity analysis of the compositions of Examples and Comparative Examples are shown in Table 2 below.

TABLE 2

|  | Processing Temperature (° C.) | Exothermal Onset Temperature (° C.) | Process Window (° C.) | Residue (%) at 800° C. |
|---|---|---|---|---|
| Example 1 | 178 | 296 | 78 | 74 |
| Comparative Example 1 | 233 | 261 | 28 | 68 |

From the results of Table 2, it can be confirmed that the composition in the present application has a low processing temperature and thus is capable of producing a prepolymer at a low temperature, secures a wide process window of 100° C. or higher, and exhibits excellent heat resistance characteristics. Furthermore, it can be confirmed that the composition exhibits a low viscosity in a molten state and thus a final product without comprising voids due to bubbles or the like can be formed.

The invention claimed is:

1. A phthalonitrile resin comprising a polymerized unit derived from a compound of Formula 1 below and an aromatic amine compound, wherein a processing temperature of a mixture comprising the compound of Formula 1 and the aromatic amine compound is 100° C. to 250° C., the processing temperature being a melting temperature or a glass transition temperature of the mixture, and wherein an absolute value of the difference between the processing temperature and a curing temperature of the mixture is 50° C. or higher:

[Formula 1]

wherein in Formula 1, $Ar_1$ and $Ar_2$ are aromatic divalent radicals derived from an aromatic compound represented by Formula 2 below, $X_1$ and $X_2$ are oxygen atoms, and $R_1$ to $R_{10}$ are each independently hydrogen, an alkyl group having 1 to 4 carbon atom(s) or a cyano group, provided that at least two of $R_1$ to $R_5$ are each a cyano group and at least two of $R_6$ to $R_{10}$ are each a cyano group;

[Formula 2]

wherein in Formula 2, one of $R_1$ and $R_4$ of Formula 2 forms a radical linked to the sulfur atom (S) of Formula 1, and the other of $R_1$ and $R_4$ of Formula 2 forms a radical linked to $X_1$ or $X_2$ of Formula 1, and $R_2$, $R_3$, $R_5$ and $R_6$ of Formula 2 are each independently hydrogen or an alkyl group having 1 to 4 carbon atom(s).

2. The phthalonitrile resin according to claim 1, wherein in Formula 1 $R_3$, $R_4$, $R_8$ and $R_9$ are each a cyano group, and $R_1$, $R_2$, $R_5$, $R_6$, $R_7$ and $R_{10}$ are each independently hydrogen or an alkyl group having 1 to 4 carbon atoms.

3. A polymerizable composition comprising a compound of Formula 1 below and an aromatic amine compound, wherein a processing temperature of the polymerizable composition is 100° C. to 250° C., the processing temperature being a melting temperature or a glass transition temperature of the polymerizable composition, and wherein an absolute value of the difference between the processing temperature and a curing temperature of the polymerizable composition is 50° C. or higher:

[Formula 1]

wherein, in the Formula 1, $Ar_1$ and $Ar_2$ of the Formula 1 are aromatic divalent radicals derived from an aromatic compound represented by Formula 2 below, $X_1$ and $X_2$ of the Formula 1 are oxygen atoms, and $R_1$ to $R_{10}$ of the Formula 1 are each independently hydrogen, an alkyl group having 1 to 4 carbon atom(s), or a cyano group, provided that at least two of $R_1$ to $R_5$ of the Formula 1 are each a cyano group and at least two of $R_6$ to $R_{10}$ of the Formula 1 are each a cyano group:

[Formula 2]

Wherein, in the Formula 2, one of $R_1$ and $R_4$ of the Formula 2 forms a radical linked to the sulfur atom (S) of the Formula 1 and the other of $R_1$ and $R_4$ of the Formula 2 forms a radical linked to $X_1$ or $X_2$ of the Formula 1, and $R_2$, $R_3$, $R_5$ and $R_6$ of the Formula 2 are each independently hydrogen or an alkyl group having 1 to 4 carbon atom(s).

4. The polymerizable composition according to claim 3, wherein the compound of Formula 1 has a viscosity in a range of 100 cP to 10,000 cP at a temperature of 150° C. or higher.

5. A prepolymer which comprises a reacted product of the polymerizable composition of claim 3.

6. A composite comprising the phthalonitrile resin of claim 1 and a filler.

7. The composite according to claim 6, wherein the filler is a metal material, a ceramic material, glass, a metal oxide, a metal nitride or a carbon-based material.

* * * * *